Jan. 10, 1950

A. FERMANIAN ET AL
APPARATUS FOR SOLDERING LEAD
WIRES TO ELECTRICAL UNITS 2,494,474

Filed Jan. 12, 1949

5 Sheets-Sheet 1

INVENTORS
A. FERMANIAN
G. W. SODERMAN
W. J. WORKMAN
BY
W. C. Parnell
ATTORNEY

Jan. 10, 1950

A. FERMANIAN ET AL

APPARATUS FOR SOLDERING LEAD WIRES TO ELECTRICAL UNITS 2,494,474

Filed Jan. 12, 1949

5 Sheets-Sheet 2

INVENTORS
A. FERMANIAN
G. W. SODERMAN
W. J. WORKMAN

BY [signature]
ATTORNEY

INVENTORS
A. FERMANIAN
G. W. SODERMAN
W. J. WORKMAN
BY W. C. Parnell
ATTORNEY

INVENTORS
A. FERMANIAN
G. W. SODERMAN
W. J. WORKMAN
BY
W. C. Parnell
ATTORNEY

Jan. 10, 1950

A. FERMANIAN ET AL
APPARATUS FOR SOLDERING LEAD WIRES TO ELECTRICAL UNITS 2,494,474

Filed Jan. 12, 1949

5 Sheets-Sheet 5

INVENTORS
A. FERMANIAN
G. W. SODERMAN
W. J. WORKMAN

BY W. C. Parnell
ATTORNEY

Patented Jan. 10, 1950 2,494,474

UNITED STATES PATENT OFFICE 2,494,474

APPARATUS FOR SOLDERING LEAD WIRES TO ELECTRICAL UNITS

Armen Fermanian, Rutherford, George W. Soderman, West Englewood, and William J. Workman, North Arlington, N. J., assignors to Western Electric Company, Incorporated, New York, N. Y., a corporation of New York Application January 12, 1949, Serial No. 70,422

11 Claims. (Cl. 219—12)

This invention relates to apparatus for soldering lead wires to electrical units, more particularly to fragile articles such as quartz or synthetic crystals.

In the manufacture of electrical units of which crystal wafers are to form parts thereof, difficulties arise during the processing of the crystal wafers and the soldering of lead wires thereto due to the brittle nature of the wafers, particularly when they have been reduced to the sizes desirable for the electrical units.

An object of the invention is to provide a soldering apparatus which is simple in structure and readily actuable only in a given manner to assure accurate soldering of lead wires to articles.

With this and other objects in view, the invention comprises an apparatus including a support for an article to which a lead wire is to be soldered, the article being supported in a fixed position while the lead wire is carried by an arm movable relative to the article to position the end of the lead wire in engagement with the given portion of the article. A heating element carried by the arm becomes energized when the lead wire is in a position to be soldered whereby a solder ball carried by the lead wire will be fused, soldering the lead wire to the article.

More specifically, the soldering apparatus includes a clamp for one member of an article holder in which articles such as quartz or synthetic crystals of various thicknesses may be mounted singly. A pair of interlinked pivoted arms are disposed upon opposite sides of the article support and movable between loading positions and soldering positions. Soldering units for receiving lead wires are carried by the arms, one of them being mounted at a fixed position within its arm while the other unit is movable relative to its arm, through the aid of a calibrated dial or hand wheel, depending upon the thickness of the crystal in the holder. An interlocking mechanism associated with the arms and the clamping means for the holder permits actuation of the clamping means into open position to release the holder only when the arms are in their loading positions, the arms being held out of their soldering positions by this mechanism until the mechanism has been actuated to clamp the article holder. This is the result of a pin carried by one of the arms entering an aperture in an eccentric-like cam, which is utilized to actuate the clamping mechanism, only when the article support is in a proper position to be clamped, the pin holding the eccentric cam against actuation to free the article support until the arms have been moved out of the soldering position.

Other objects and advantages will be apparent from the following detailed description when considered in conjunction with the accompanying drawings, wherein Fig. 1 is a front elevational view of the soldering apparatus;

Figure 1:
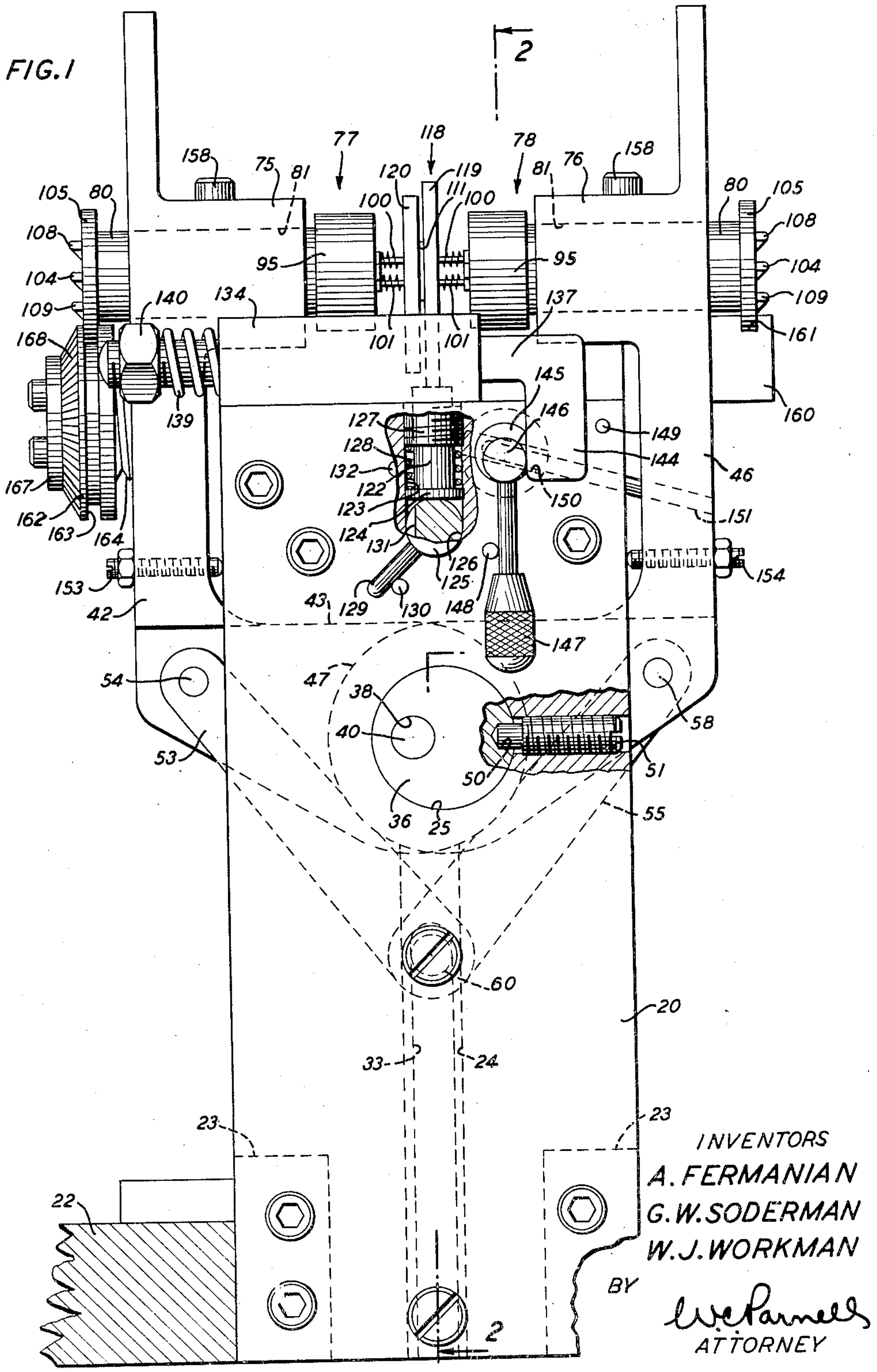

Referring now to the drawings, the soldering apparatus includes vertical members 20 and 21 having their lower ends mounted in a suitable support 22 and connected by spaced lateral members 23. The member 20 has a vertically extending groove 24 in its inner surface terminating at an aperture 25. Latches 26 and 27 in the form of spring pressed pins are mounted in the member 20, the pin-like ends of the latches being urged outwardly into the groove 24 through their apertures 28 and 29 under the forces of their springs 30 and 31. The purpose of these latches will be described hereinafter.

The vertical member 21 has a vertical slot 33 disposed in general alignment with the groove 24 of the vertical member 20 and terminates short of an aperture 34 which is in axial alignment with the aperture 25. Pivot members 36 and 37 are disposed in the apertures 25 and 34 of the vertical members 20 and 21, the pivot members having aligned eccentric apertures 38 and 39 therein to receive a pivot pin 40 eccentric with the axes of the pivot members 36 and 37.

An arm 42 of the general contour shown has an inwardly projecting lower portion 43 interposed between the vertical members 20 and 21 and also the pivot members 36 and 37 (Fig. 2) and is apertured at 44 to receive the pivot pin 40 which constitutes the pivotal support for the arm 42.

An arm 46, similar in general contour to the arm 42 has spaced parallel lower members 47 positioned to straddle the lower member 43 of the arm 42 and provided with apertures 48 to receive the pivot members 36 and 37 which jointly constitute the pivotal support for the arm 46. The pivot members 36 and 37 are identical in structure and have apertures 50 at selected portions in their periphery to receive locking screws 51 (Fig. 1) only one of which is shown in the drawings.

The arm 42 has spaced parallel links 53 disposed upon each side of the lower portion 43 of the arm with their upper ends connected to a single pivot 54 carried by the portion 43. A single link 55, similar in contour to the links 53, but of greater thickness, equaling the thickness of the lower member 43 of the arm 42, has its upper end extending between the parallel portions 47 of the arm 46 where it is pivotally supported by a pin 58. The lower ends of the links 53 and 55 have aligned apertures therein for receiving a rod 60 having a head portion 61 with a concaved recess 63 therein to receive either of the latches 26 or 27 when moved into registration therewith travelling in a guided path in the groove 24 during movement of the arms 42 and 46 between their upper or soldering positions and their lower or loading positions. A spring 65 having its upper end connected to a pin 66 carried by the vertical member 21 and its lower end connected to the rod 60, normally urges the arms 42 and 46 from the loading position shown in Fig. 3 to the soldering position shown in Figs. 1 and 2. A dashpot unit 70 including a cylindrical element 71 carried by the rod 60 and a piston-like element 72, supported by a bracket 73 mounted at 74 on the upper end of the vertical member 21, acts to prevent rapid movement of the arms 42 and 46 into the soldering positions.

Figure 7:
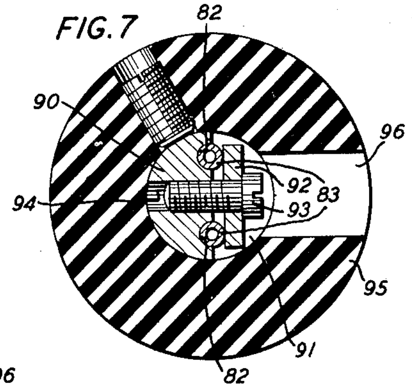
Fig. 7 is a vertical sectional view taken along the line 7—7 of Fig. 5.

The arms 42 and 46 have integral tubular portions 75 and 76 for receiving and supporting soldering units 77 and 78 respectively. The units 77 and 78 are identical in structure and a description of the unit 78 shown in detail in Figs. 5, 6, 7 and 8 will apply equally well to the description of the unit 77. The unit 78 includes a main member 80 circular in cross-section and mounted in an aperture 81 of the tubular portion 76. Parallel apertures 82 are formed in the member 80 to receive hypodermic needle-like tubular elements 83. The apertures 82 are enlarged for portions of their lengths to receive springs 84, adjusting screws 85 and the heads 86 of plungers 87 which enter the tubular elements 83 for a purpose hereinafter described. A reduced end 90 of the member 80 is cut away at 91 to the center thereof and through half the apertures 82 whereby a clamp 92 forced inwardly by a screw 93, disposed in a threaded aperture 94 (Fig. 7), may firmly hold the tubular elements 83 against longitudinal movement.

An annular element 95 of insulating material is mounted concentrically on the reduced portion 90 of the main member 80 and has a radially extending aperture 96 (Fig. 7) providing access to the screw 93. Also three substantially equally spaced apertures 97 are disposed in the element 95 for receiving terminals 98. The outer ends of the terminals are slit as indicated at 99 to receive the ends of heating elements 100 and 101. The terminals 98 are locked in place in their respective apertures by set screws 102. The heating elements 100 and 101 are substantially identical in structure having helical portions surrounding the outer ends of their respective tubular elements 83, certain of their ends being disposed in the notches 99 of their respective terminals and clamped in place by the set screws 102 while the remaining ends of the heating elements are disposed in the notch 99 of the remaining terminal and clamped in place by its set screw 102.

Figure 2:
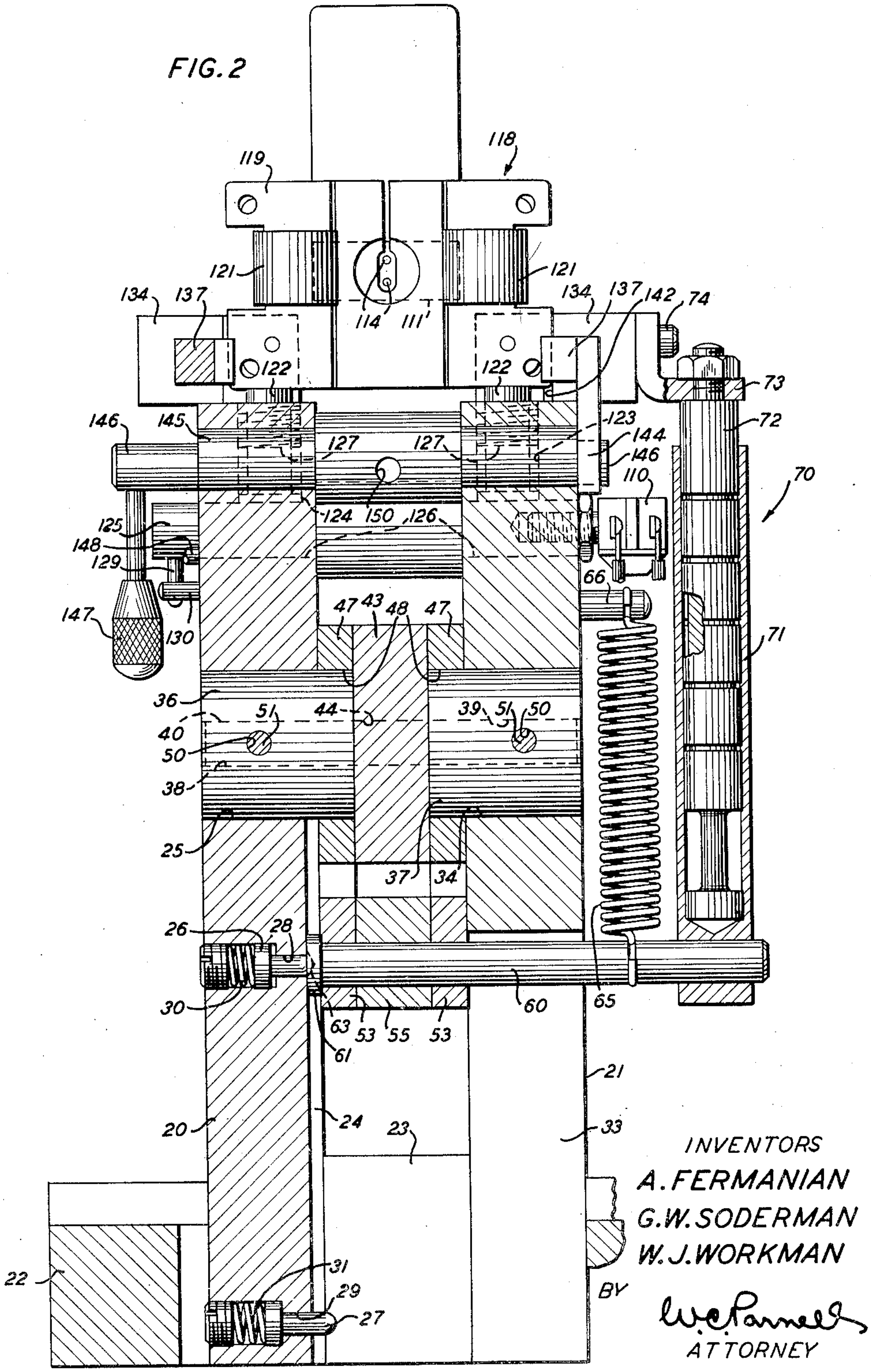
Fig. 2 is a vertical sectional view taken along the line 2—2 of Fig. 1.
Figure 8:
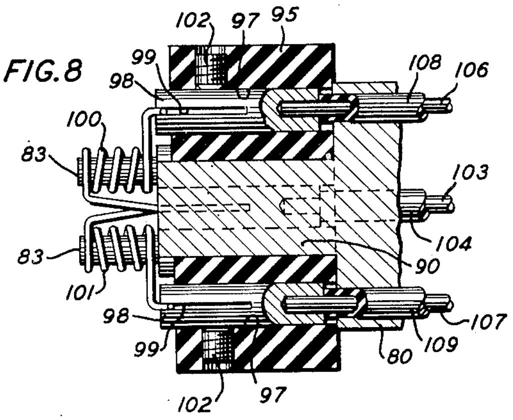
Fig. 8 is a fragmentary sectional view taken along the line 8—8 of Fig. 6.

A conductor 103, having its inner end electrically connected to the central terminal for both heating elements, is suitably insulated at 104 and extends longitudinally through an aperture in the main member 80 and through apertures in a plate 105 mounted on the opposite end of the member 80. Conductors 106 and 107 are electrically connected to the remaining terminals as illustrated in Fig. 8, these conductors being suitably insulated at 108 and 109 and extending through parallel apertures in the member 80 and in the plate 105. The conductors 106 for the heating elements 101, when the units 77 and 78 are moved into their soldering positions, will be under the control of a switch 110 (Fig. 2). The switch 110 and its function for maintaining the heating elements 101 of units 77 and 78 deenergized during operating cycles of the apparatus will be described hereinafter.

Figure 10:
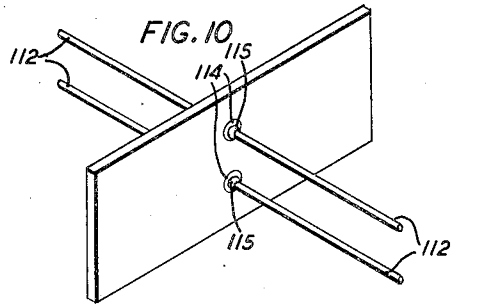
Fig. 10 is an enlarged isometric view of the article after the lead wires have been soldered thereto.
Figure 9:
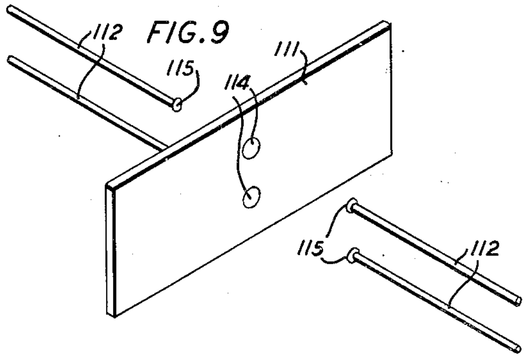
Fig. 9 is an enlarged isometric view of an article such as a crystal and the relative positions of the lead wires about to be soldered thereto.
Figure 5:
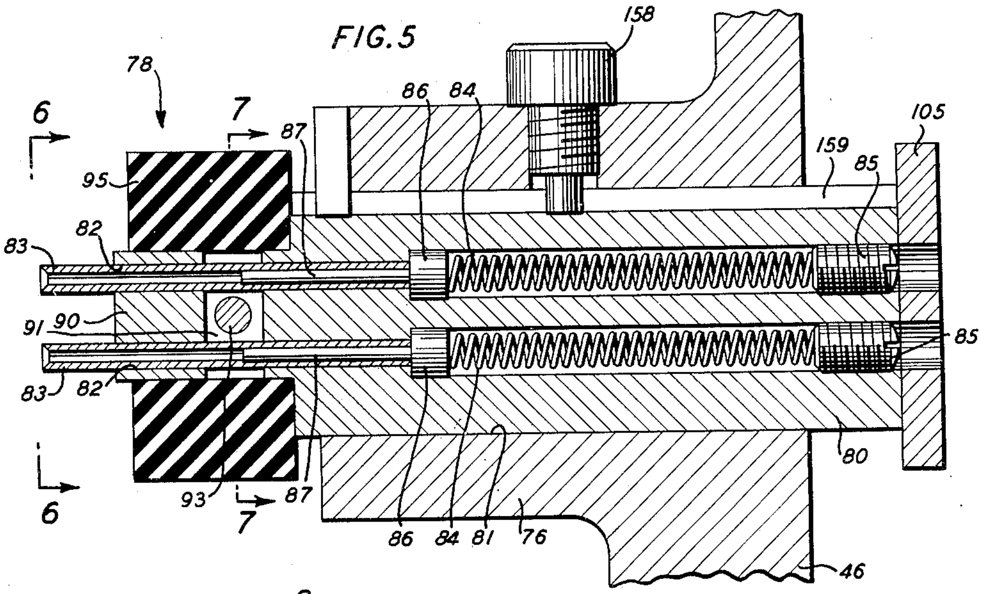
Fig. 5 is an enlarged detailed sectional view of one of the arms and its soldering unit.
Figure 6:
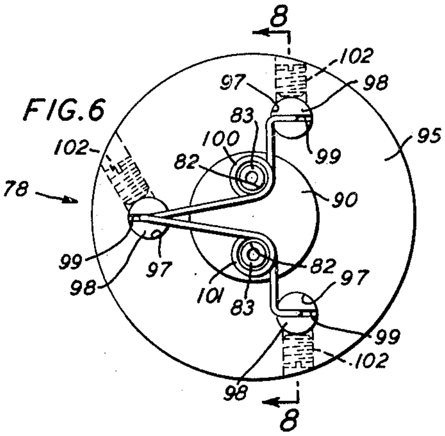
Fig. 6 is an end elevational view taken along the line 6—6 of Fig. 5.

Attention is now directed to Fig. 9 which illustrates an article 111 to which lead wires 112 are to be soldered as illustrated in Fig. 10. In the present embodiment of the invention, the article 111 is a synthetic crystal wafer which may have one or two lead wires soldered to opposing faces thereof. Figs. 9 and 10 illustrate how two lead wires are to be soldered to given portions of the opposing surfaces of the crystal. The article or crystal has disc-like metallic members 114 secured to the portions of each surface to which the ends of the lead wires are to be soldered. The lead wires are provided with solder balls 115 at their inner ends which are to be fused by the radiant heat from the heating elements 100 and 101 to cause soldering of the lead wires to the portions 114 of the crystal. If only one lead wire is to be secured to each side of the crystal, a disc-like member 114 will then be centrally located upon each face of the crystal to receive its respective lead wire.

The article or crystal 111 is centrally located in a holder 118 which is the subject matter of a copending application of G. W. Soderman, Serial No. 55,577, filed October 20, 1948. The holder 118 includes a main member 119 and a companion member 120, these members being urged toward each other by split cylindrical springs 121 to firmly hold the article 111 at a given position therebetween, whereby the members 114 will be properly positioned for the soldering of the lead wires 112 thereto. Spaced supporting elements 122 (Figs. 1, 2 and 4) are disposed in vertical apertures 123 in the vertical members 20 and 21 and provided with head portions 124 which rest upon a cam rod 125 disposed in aligned apertures 126 in the vertical members. Threaded sleeves 127 disposed in threaded end portions of the apertures 123 concentric with the supporting elements 122 serve as vertical guides for these elements and provide abutments for springs 128, which are disposed concentric with their supporting elements, to normally urge them downwardly against the cam 125. The cam 125, when in the position shown in Fig. 1 with its operating handle 129 against its lower stop 130, positions the supporting elements to support the holder 118 accurately for aligning the pairs of members 114 on the crystal 111 in alignment with pairs of the lead wires when disposed in their respective tubular elements 83 of the soldering units 77 and 78. A flat surface 131 on the cam 125 may be moved beneath the supporting elements 122 when the handle 129 is moved into engagement with the upper stop 132 to allow the springs 128 to lower the supporting elements whereby the lowermost tubular elements 83 and their heating elements 101 will be in alignment with the centerpoints of the crystals 111.

The crystals 111 may vary in thickness. The holder 118, however, mounted with the main member 119 in a fixed position, the position of the companion member 120 being variable with variations in the thickness of the crystals mounted in the holder. Clamping means are therefore provided to grip only the main member 119 of the holder 118. These clamping means are shown in detail in Fig. 4 and include main members 134 mounted on their respective vertical members 20 and 21 and having shoulders 136 against which the main member 119 of the holder is placed when resting upon the supporting elements 122. Clamping elements 137 are mounted for longitudinal movement in apertures 138 of their respective members 134 and are normally urged to the left by springs 139. The clamping forces of the clamping elements may be varied through adjustment of nuts 140, threadedly mounted on the elements, to vary the forces of the springs 139. One of the clamping elements 137 is provided with a spring pressed ball member 141 positioned to engage the adjacent end of the main member 119 of the holder 118 to urge the holder in the opposite direction against a locating surface 142 prior to the movement of the clamping elements into their final clamping positions forcing the main member of the holder against the surfaces 136. The clamping elements 137 have downwardly projecting portions 144 (Fig. 1) positioned in engagement with a rotatable cam 145 journalled in aligned apertures in the vertical members 20 and 21. End portions 146 of the cam 145 which engage the downwardly projecting portions 144 of the clamping elements are mounted eccentrically with respect to the axis of the cam 145 whereby rotation of the cam by the aid of a handle 147 from the closed position against the lower stop 148 to the open position against the upper stop 149 will bring about movement of the clamping elements 137 to the right (Fig. 4) against the forces of their springs 139. The key-like cam 145 has an aperture 150 in its central portion positioned to register with a pin 151 carried by the arm 46, when the cam is in the position shown in Fig. 1, assuring closing of the clamping elements against the holder 118. The cam 145 also acts to prevent movement of the arms 42 and 46 into their soldering positions until the holder with the crystal has been locked in place. This is made possible by the pin 151 striking the cam 145 and being held against further movement until the aperture 150 has been moved into the proper position to receive the pin.

Figure 3:
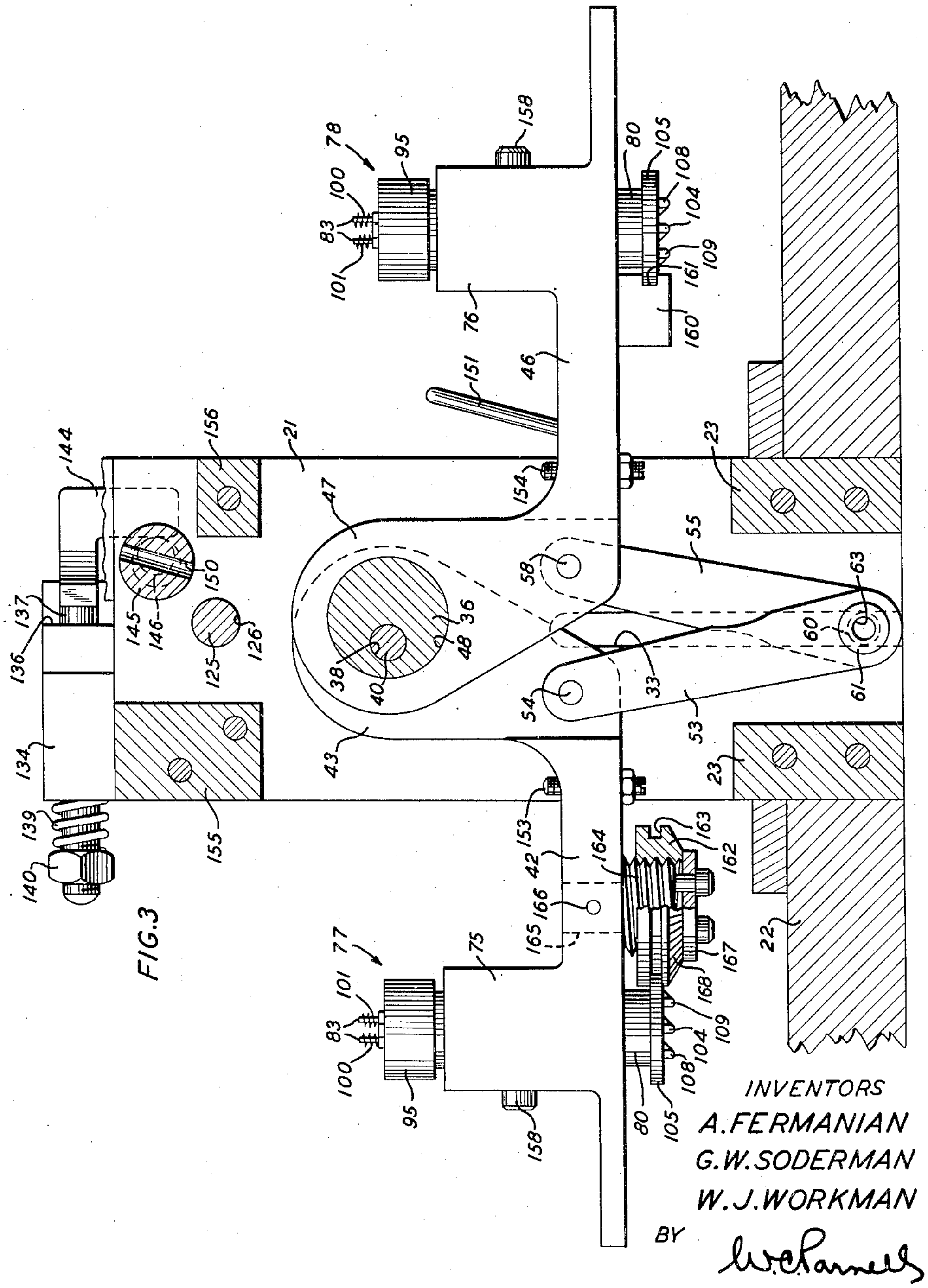
Fig. 3 is a fragmentary vertical sectional view of the soldering apparatus showing the arms with their soldering units in their loading positions.

It will be noted by viewing Fig. 3 that the arms 42 and 46 when in their loading position are disposed in a substantially horizontal plane with the elements 83 of the units 77 and 78 disposed in vertical positions to readily receive the lead wires 112. One of the important features of this apparatus lies in the mechanism for accurately positioning the lead wires in engagement with their respective portions 114 of the crystal 111 and under a predetermined pressure whereby a satisfactory soldering operation may be performed. Adjustable stops 153 and 154 in the form of adjustable screws disposed in threaded apertures of their respective arms are positioned to engage lateral members 155 and 156 interposed between the vertical members 20 and 21 and secured thereto. The stops 153 and 154, upon engaging their respective members 155 and 156, will determine the vertical positions of the arms 42 and 46 and the distances the units 77 and 78 are spaced from the crystal 111. The unit 78 in the arm 46, although movable longitudinally in its aperture 81 of the arm 46 when initially disposed therein, is held against rotation by a screw 158 mounted in the tubular portion 75 and having its inner end disposed in a longitudinal groove 159 of the member 80. A grooved retaining element 160 (Figs. 1 and 3), fixedly mounted on the arm 46, has a groove 161 positioned to receive the member 105 to hold the member 80 of the unit 78 at a fixed position in the arm 46. Adjustment of the unit 78 is not necessary in that the surfaces of the crystals 111 to which lead wires, placed in the unit 78, will be secured and will always be at a given position governed by the positions of the locating surfaces 136 of the clamping mechanism shown in Fig. 4. It is essential, however, that the unit 77 be adjustable in the tubular portion 75 of the arm 42 to allow for variations in the thicknesses of the crystals 111. The screw 158 for the main member 80 of the unit 77 extends into the longitudinal groove 159 a sufficient distance to allow longitudinal movement of the unit 77 in its tubular member 75 and hold the unit against rotation. An adjusting wheel 162 has a peripheral groove 163 to receive a portion of the end plate 105 of the unit 77 and to impart longitudinal movement to the unit during rotation of the adjusting wheel. The adjusting wheel is internally threaded and is mounted on a fixed position threaded element 164. A reduced portion 165 of the threaded element 164 is disposed in an aperture in the arm 42 and secured in place by a pin 166. A plate 167 carried by the threaded element 164 holds the wheel 162 against accidental removal from the threaded element 164. Indications 168 are disposed on the adjusting wheel 162 and movable relative to a fixed point which may be mounted on the plate 167 to indicate measured distances corresponding to thicknesses of the crystals 111 or distances from the inner face of the main member 119 of the holder 118.

Considering now the operation of the apparatus, let it be assumed that a holder 118 has an article or crystal 111 mounted therein to be placed in the apparatus. The handle 147 (Fig. 1) is moved from its position in engagement with the stop 148 into engagement with the stop 149, causing the clamping elements 137 to move to the right (Fig. 4) against the forces of their springs 139 after which the operator may readily position the holder 118 upon the supporting elements 122 adjacent the surfaces 136. This constitutes one part of the loading operation for the apparatus. To complete the loading operation, the operator places lead wires 112 in the tubular members 84 of both units 77 and 78, while the arms 42 and 46 are in the loading positions shown in Fig. 3.

If the operator should attempt to move the arms into their vertical or soldering positions before the clamping means for the holder 118 has been actuated into clamping position, the pin 151 (Fig. 3) will engage the central portion 145 of the actuating cam for the clamping mechanism, stopping further movement of the arms toward their vertical positions. The operator must then rotate the cam for the clamping mechanism by moving the handle 147 from engagement with the stop 149 into engagement with the stop 148. In this manner, the aperture 150 will be moved to receive the pin 151 as illustrated in Fig. 1 enabling the operator to complete movement of the arms 42 and 46 into their vertical positions and to move the solder bearing ends 115 of the lead wires 112 into engagement with the portions 114 of the crystal 111.

Figure 4:
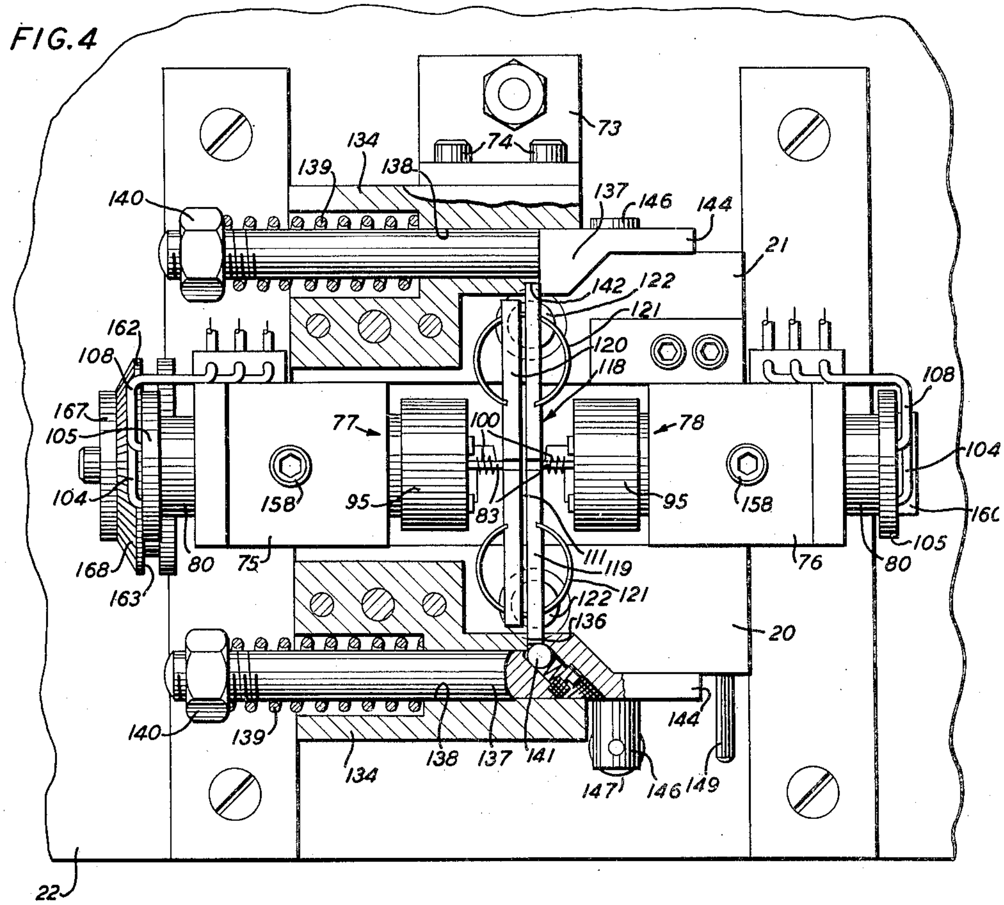
Fig. 4 is a top plan view of the apparatus, portions thereof being shown in section.

Returning to the clamping mechanism shown in Fig. 4, it will be observed that the ball member 141 will engage the adjacent end of the main member 119 of the holder 118 causing the holder to move until the opposite end thereof engages the locating surface 142 to accurately locate the holder in one direction. The clamping elements complete the accurate location of the holder when they are closed upon the main member 119 and move its ends into engagement with the locating surfaces 136. The moving means for the clamping elements 137 is embodied in the springs 138. The upper ends of the arms 42 and 46 constitute handles for the arms enabling the operator to readily move the arms between the loading position and the soldering position. It will be noted that the links 53 and 55 connecting the arms 42 and 46 maintain uniform and like movements in both arms so that when either arm is moved in one direction, the other arm will follow it. This assures positioning of the lead wires 112 in engagement with their respective surfaces of the crystals simultaneously and also movement of the unit 77 and 78 away from the crystals after the completion of the soldering operations. The rod 60, which is the connecting means for the links 53 and 55, having its head portion 61 riding in the vertical groove 24, maintains uniform positioning of the arms 42 and 46 with their units 77 and 78. The latches 26 and 27 also function to temporarily secure the arms in their soldering and loading positions. It is the purpose of the spring 65 to assist the operator in moving the arms with their respective units into the soldering positions, while at the same time the dashpot unit 70 cushions the movement of the arms with their units to eliminate the possibility of damage to the lead wires or the crystal by rapid movement of the units supporting the lead wires into the soldering positions. The springs 84 (Fig. 5) of the unit 77 and 78 assisted by their plungers 87, present another cushioning means directly associated with the lead wires to apply the desired pressure on the lead wires to assure a satisfactory soldering operation and to allow for any variations in the lengths of the lead wires.

When the units supporting the lead wires have been moved into their soldering positions, placing the ends carrying the soldering balls 115 adjacent the portions 114, the heating elements 100 and 101 may be energized through the closing of electrical circuits therefore, these circuits being closed either automatically or manually by suitable means (not shown). The radiant heat from the heating elements will in a short length of time fuse the solder balls 115, thus soldering the lead wires 112 to the portions 114 of the crystal 111. After the lapse of a given length of time for this operation, the electrical circuits to the heating elements are opened. The operator may then move the arms 42 and 46 with their units 77 and 78 from the soldering positions into the loading positions. Should the operator attempt to remove the holder 118 with the completed article, before the arms with their respective soldering units are moved into the loading positions, or a sufficient distance away from the article to free the lead wires which have been soldered to the article, it would not be possible to actuate the clamping mechanism through movement of the handle 147 as this mechanism is held against operation by the pin 151 being disposed in the aperture 150. However, after the arms have been returned to their loading positions, the operator may freely actuate the handle 147 counterclockwise into engagement with the stop 149 freeing the holder 118 with the completed article, whereby it may be removed from the apparatus and another holder, with its article or crystal, disposed in the clamping mechanism.

If the article or crystal in the holder 118 has only one of the members 114 centrally mounted on each side thereof to receive one lead wire upon each side, in place of two as previously described, the operator may readily condition the apparatus for this operation. The handle 129 (Fig. 1) is moved from the stop 130 to the stop 132, rotating the cam 125 until the flat surfaces 131 are parallel with the head portions 124 of the supporting elements 122 allowing downward movement of the supporting elements under the forces of their springs 128 whereby the supporting elements will accurately locate the central members 114 of the crystal in alignment with the lower tubular elements 83 of the units 77 and 78. At the same time, during rotation of the cam 125, the switch 110 (Fig. 2) is operated to open the previously described circuits to the upper heating elements 100 of the units 77 and 78, maintaining the circuits to the lower heating elements 101 effective to solder the single wires to the members 114 of the article or crystal. The operation of the apparatus is the same for either single wires or double wires with the one exception; namely, that the operator places single wires in the innermost elements 83 of the units 77 and 78 when in the loading position which will be the lowermost elements 83 in the soldering positions. Otherwise the operation of the apparatus is the same.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a soldering apparatus, a support for an article to which a part is to be soldered, a clamp to removably clamp the article on the support, a holder for the part to be soldered to the article movable into and out of soldering position relative to the support for the article, and means operable for movement of the clamp into and out of its clamping position and to bar movement of the holder into its soldering position until the clamp is moved into its gripping position.

2. In a soldering apparatus, a support for an article to which a part is to be soldered, a clamp to removably clamp the article on the support, a holder for the part to be soldered to the article movable into and out of soldering position relative to the support for the article, an actuator movable between given limits to effect movement of the clamp into and out of clamping position, and an element movable with the holder to engage the actuator to bar movement of the holder into its soldering position until the clamp is moved into its clamping position to hold the article against displacement, the element rendering the actuator immovable to operate the clamp to free the article until the holder is moved out of its soldering position.

3. In a soldering apparatus, a support for an article to which a part is to be soldered, a clamp to removably clamp the article on the support, a holder for the part to be soldered to the article movable into and out of soldering position relative to the support for the article, a projection movable with the holder, and a key operable to effect movement of the clamp into and out of its clamping position and having an aperture therein whereby the said projection may be received therein to effect movement of the holder into its soldering position only when the key is moved to effect movement of the clamp into its clamping position, the projection in the aperture of the key holding the key against operation of the clamp to free the article until the holder is moved out of its soldering position to move the projection out of the aperture of the key.

4. In an apparatus for soldering a lead wire to an article, a support for the article, a clamp to removably clamp the article on the support, a soldering unit having a tubular member to receive and support the lead wire for movement into engagement with the article, an electrical heating element extending around the tubular member and energizable to effect soldering of the lead wire to the article, and means to support the soldering unit for movement between a loading position away from the support and a soldering position adjacent the support.

5. In an apparatus for soldering a lead wire to an article, a support for the article, a clamp to removably clamp the article on the support, a soldering unit having a tubular member to receive and support the lead wire for movement into engagement with the article, a spring pressed plunger extending into the inner end of the tubular member to act as a cushion for the lead wire when the outer end of the lead wire is moved into engagement with the article, an electrical heating element extending around the tubular member and energizable to effect soldering of the lead wire to the article, and means to support the soldering unit for movement between a loading position away from the support and a soldering position adjacent the support.

6. In an apparatus for soldering one or more lead wires to an article, a support for the article mounted for movement in one position, for locating the article for soldering one lead wire thereto, and in another position for soldering more than one lead wire thereto, a soldering unit having parallel tubular members disposed at spaced positions to receive and support lead wires for movement into engagement with given portions of the article relative to its center, an electrical heating element for each tubular member energizable to effect soldering of the lead wires to the article, means to support the soldering unit for movement between a loading position away from the support and a soldering position adjacent the support, and a transferring element actuable to transfer the support into either of its positions.

7. In an apparatus for soldering one or more lead wires to an article, a support for the article mounted for movement in one position, for locating the article for soldering one lead wire thereto, and in another position for soldering more than one lead wire thereto, a soldering unit having parallel tubular members disposed at spaced positions to receive and support lead wires for movement into engagement with given portions of the article relative to its center, an electrical heating element for each tubular member energizable to effect soldering of the lead wires to the article, means to support the soldering unit for movement between a loading position away from the support and a soldering position adjacent the support, a transferring element actuable to transfer the support into either of its positions, and an electrical switch operated by the actuation of the transfer element to render either one or all the heating elements energizable when the support for the article is respectively located for the soldering of one and all the lead wires thereto.

8. In an apparatus for soldering a lead wire to an article, a support for the article, a fixed position side locating surface to be engaged by one side of the article, a fixed position end locating surface to be engaged by one end of the article, a clamping element actuable to engage the article and clamp it against the side locating surface, means actuable with the clamping element to force the article against the end locating surface prior to the clamping of the article against the side locating surface, means to actuate the clamping element, and means to solder lead wires to the article.

9. In an apparatus for soldering a lead wire to an article, a support for the article, a clamp to removably clamp the article on the support, a soldering unit having a tubular member to receive and support the lead wire for movement into engagement with the article, an electrical heating element extending around the tubular member and energizable to effect soldering of the lead wire to the article, an arm to support the soldering unit movable between a loading position, to receive the lead wire, and a soldering position, to position the lead wire in engagement with the article, and calibrated means to move the soldering unit measured distances in the arm to vary the position of the soldering unit when in the soldering position, relative to the article.

10. An apparatus for soldering lead wires to an article mounted at a given position in a holder composed of a main member and a companion member urged toward each other to firmly hold the article at a given position therein, and exposed central portions of opposing sides to which the lead wires are to be soldered, the apparatus comprising a support for the holder, fixed position side and end locating surfaces to be engaged by one side and one end of the main member of the holder to locate one surface of the article at a predetermined position in a given plane, means to clamp the main member of the holder against the locating surfaces, pivotally supported companion arms movable between loading positions and soldering positions, links connecting the arms, a rod connecting the links, means to guide the rod in a fixed path during movement of the links whereby movement of one arm will impart a like movement to the other arm, latches to cooperate with the rod to hold the arms in the soldering and loading positions, soldering units carried by the arms and including parallel tubular members to receive and support the lead wires, a heating element extending around each tubular member and energizable to effect soldering of the lead wires to the article, means to fixedly secure one of the soldering units in its arm, calibrated in terms of article thickness to adjust the other soldering unit relative to its arm, and a dashpot unit connected to the said rod to hold the arms against rapid movement of the soldering units into their soldering positions.

11. An apparatus for soldering lead wires to an article mounted at a given position in a holder composed of a main member and a companion member urged toward each other to firmly hold the article at a given position therein, and exposed central portions of opposing sides to which the lead wires are to be soldered, the apparatus comprising a support for the holder, fixed position side and end locating surfaces to be engaged by one side and one end of the main member of the holder to locate one surface of the article at a predetermined position in a given plane, means to clamp the main member of the holder against the locating surfaces, pivotally supported companion arms movable between loading positions and soldering positions, links connecting the arms, a rod connecting the links, means to guide the rod in a fixed path during movement of the links whereby movement of one arm will impart a like movement to the other arm, latches to cooperate with the rod to hold the arms in the soldering and loading positions, soldering units carried by the arms and including parallel tubular members to receive and support the lead wires, a heating element extending around each tubular member and energizable to effect soldering of the lead wires to the article, means to fixedly secure one of the soldering units in its arm, calibrated in terms of article thickness to adjust the other soldering unit relative to its arm, a dashpot unit connected to the said rod to hold the arms against rapid movement of the soldering units into their soldering positions, an actuator to cause movement of the support for the holder to locate the article to receive a lead wire adjacent the center thereof from each soldering unit, and a switch under the control of the actuator to render only one heating element on each soldering unit effective to solder single lead wires to each side of the article.

ARMEN FERMANIAN.
GEORGE W. SODERMAN.
WILLIAM J. WORKMAN.

REFERENCES CITED

The following references are of record in the file of this patent:

UNITED STATES PATENTS

| Number | Name | Date |
|---|---|---|
| 1,435,470 | Hosford | Nov. 14, 1922 |

FOREIGN PATENTS

| Number | Country | Date |
|---|---|---|
| 580,790 | Great Britain | Sept. 19, 1946 |